April 14, 1953   H. J. C. WELLS   2,634,744
STEAM TRAP AND AIR VENT VALVE THEREFOR
Filed May 11, 1949
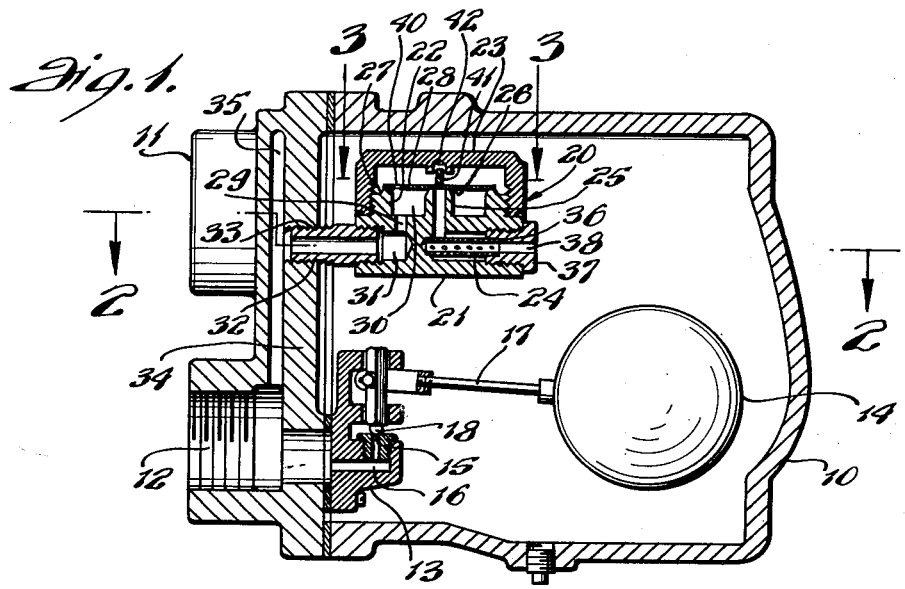
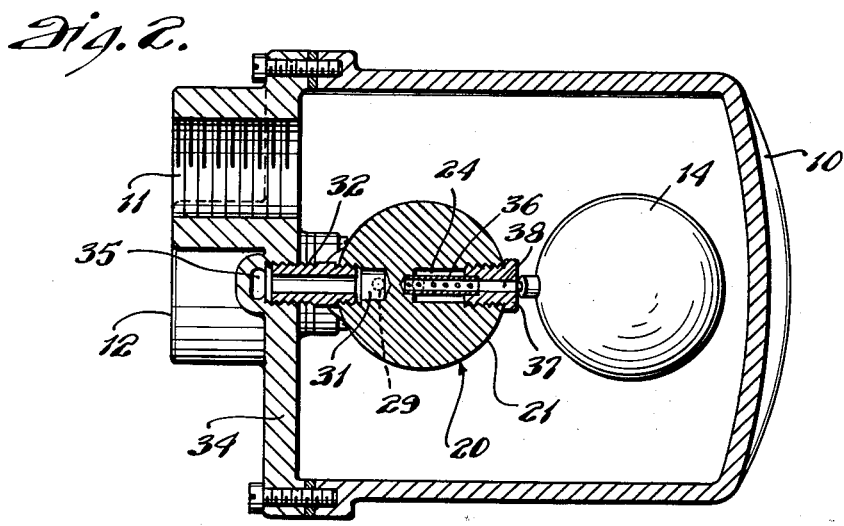
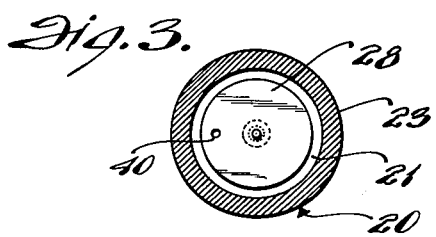
INVENTOR.
HERBERT JAMES CLEMENT WELLS
BY
Clark & Ott
ATTORNEYS Patented Apr. 14, 1953

2,634,744

UNITED STATES PATENT OFFICE 2,634,744

STEAM TRAP AND AIR VENT VALVE THEREFOR

Herbert James Clement Wells, Jackson Heights, N. Y.

Application May 11, 1949, Serial No. 92,670

3 Claims. (Cl. 137—200)

This invention relates to a steam trap having pressure operated valve means for venting the air therefrom.

The invention comprehends a steam trap having an air vent valve which is controlled in its operation by differential of pressure on opposite sides of the valve element thereof.

Another object of the invention is to provide a steam trap having an air vent valve which is operable to discharge air from the upper part of the trap when the pressure within the trap moves the valve element thereof to open relation and which valve element gravitationally closes to prevent discharge from the trap when the pressure of the steam on opposite sides of the valve element becomes equalized.

Still another object of the invention is to provide a steam trap of the indicated character in which the valve element remains in open relation so long as air is being discharged from the trap and which rapidly closes when steam is discharged.

Still another object of the invention is the provision of a ball float steam trap having an air vent valve arranged with an inlet disposed in communication with the upper portion of the trap and which functions to permit of the discharge of air from the trap while preventing the discharge of steam therefrom.

With the foregoing and other objects in view, reference is now made to the following specification and accompanying drawings in which the preferred embodiment of the invention is illustrated.

In the drawings:

Fig. 1 is a vertical sectional view through a float trap constructed in accordance with the invention.

Fig. 2 is a horizontal sectional view taken approximately on line 2—2 of Fig. 1.

Fig. 3 is a fragmentary horizontal sectional view taken approximately on line 3—3 of Fig. 1.

Referring to the drawings by characters of reference, the steam trap illustrated therein is of the float type consisting of a casing 10 having inlet and discharge openings 11 and 12 for admitting steam into the casing 10 and for discharging the water of condensation from the trap through a valve 13 controlled in its operation by a ball float 14. The valve 13 is provided with a valve seat 15 and an outlet passage 16 extending from the valve seat and opening into the discharge outlet 12. The ball float 14 is affixed to the outer end of a pivoted lever 17 having a valve element 18 connected therewith for reciprocatory movement toward and away from the valve seat by the movement of the float 14.

The inlet 11 is disposed adjacent the top of the trap for admitting steam thereto together with any moisture in the steam and water of condensation which collects in the bottom of the trap. When the water rises above the level of the valve seat the float 14 will rise to lift the valve element from its seat to thereby permit of the discharge of water from the trap and when the water in the trap falls below the level of the valve seat the float will fall to close the outlet passage.

In this type of trap very little air is discharged with the water through the valve 13 due to the fact that the water level in the trap is above the level of the seat when the float operates to open the valve. The air therefore collects in the top of the trap and prevents proper operation thereof unless means is provided for venting the air therefrom. In order to vent the air from this type of trap without interfering with the operation of the valve 13, an air vent valve 20 is provided which consists of a casing composed of a body 21 having an upwardly extending exteriorly threaded annular flange 22 on which is threadedly secured an annular cap 23. The body 21 is formed with an inlet passageway 24 which opens upwardly through a central boss 25 having its upper annular rim 26 disposed in alignment with the upper annular rim 27 of the flange 22.

The annular rim 26 of the boss 25 and the annular rim 27 of the flange 22 form concentric valve seats for a metallic disk 28 adapted to be disposed thereon for closing off the inlet passageway 24 from the outlet passageway 29 extending downwardly through the body 21 from the annular recess 30 surrounding the boss 25 and which communicates with a discharge passageway 31. A bushing 32 is threadedly engaged in the discharge passageway 31 and at its outer end is secured in an opening 33 in the wall 34 of the trap for securing the valve to the casing with the opening in the bushing in communication with a passageway 35 which opens at its lower end into the discharge outlet 12. Arranged centrally within the inlet passageway 24 is a tubular screen 36 which extends longitudinally thereof and is secured in spaced relation from the wall of the passageway by means of a reducer 37 providing a reduced inlet 38 opening into the upper portion of the casing 10 of the trap and in communication with the hollow interior of the screen.

The disk 28 is operated by differential of pressure to open and close the passageway through the boss 25 to the discharge of air from the casing 10. When the pressure within the inlet passageway 24 acting against the under side of the disk 28 is greater than the pressure against the top of the disk the same will be moved upwardly from the boss 25 and flange 22 to permit of the discharge of air through the boss 25 and thence downwardly through the outlet 29, discharge passageway 31, bushing 32, passageway 35 in the wall 34 and into the discharge outlet 12. When however, steam is admitted through the boss 25 and into the chamber above and below the disk 28, the pressure or forces acting on opposite sides thereof will be equalized to permit of the gravitational fall of the disk to thereby seat on the rim 26 and rim 27 to close off the discharge of the steam. When the steam thus admitted to the chamber above the disk 28 condenses so as to reduce the pressure therein, the pressure within the trap exerted against the under side of the disk will again raise the disk from its seat and permit of the discharge of air therefrom.

In order to permit of the more rapid dissipation of steam above the disk 28 a small aperture 40 is provided therein which opens into the annular space 30 to thereby rapidly reduce the pressure above the disk and permit of the movement of the same upwardly by the pressure within the inlet passageway 24. The disk 28 is provided with an upwardly extending stem 41 located centrally thereof which engages in a central recess 42 in the top wall of the cap 23 for centering the valve element on the valve seats.

Constructed in this manner, a steam trap of the ball float type is provided with an air vent valve which functions to vent the air collecting in the upper portion of the trap without interference with the normal discharge of water from the trap and which air vent valve closes when steam is admitted thereto.

What is claimed is:

1. In a steam trap having valve means for discharging water of condensation therefrom, an air valve for venting air from said trap including a valve casing affixed to said trap and having an inlet passageway in communication with the upper portion of the steam trap above the level of the water therein and an outlet passageway for discharging air, said inlet and outlet passageways opening into the chamber within the casing, said casing providing concentric valve seats in said chamber, a solid metallic valve element adapted to engage said seats to close off communication between said passageways, said valve element being adapted to be raised from said seats by pressure within the inlet passageway for permitting of the discharge of air from the trap, and said valve element gravitationally seating on said valve seats when steam pressure admitted to said chamber equalizes the forces on opposite sides of the valve element.

2. In a steam trap having valve means for discharging water of condensation therefrom, an air valve for venting air from said trap including a valve casing affixed to said trap and having an inlet passageway in communication with the upper portion of the steam trap above the level of the water therein and an outlet passageway for discharging air, said inlet and outlet passageways opening into the chamber within the casing, said casing providing concentric valve seats in said chamber, a solid metallic valve element having a small aperture therethrough adapted to engage said seats to subdivide the chamber into upper and lower compartments and to close off communication between said passageways, said valve element being adapted to be raised from said seats by pressure within the inlet passageway for permitting of the discharge of air from the trap and said valve element gravitationally seating on said valve seats when steam pressure admitted to said chamber equalizes the forces on opposite sides of the valve element, and said aperture in the valve element permitting of the passage of steam pressure in the upper compartment into the lower compartment and the discharge thereof through said outlet passageway whereby the pressure above the valve element is reduced to permit of the opening thereof by the pressure within the inlet passage.

3. In a steam trap, an air valve for venting air from said trap including a valve casing affixed to said trap and having an inlet passageway in communication with the upper portion of the steam trap above the level of the water therein and an outlet passageway for discharging air, said inlet and outlet passageways opening into the chamber within the casing, said casing providing concentric valve seats in said chamber, and a solid metallic valve element having a small aperture therethrough and adapted to engage said seats to subdivide the chamber into upper and lower compartments and to close off communication between said passageways, said valve element being adapted to be raised from said seats by pressure within the inlet passageway for permitting of the discharge of air from the trap and said valve element gravitationally seating on said valve seats when steam pressure admitted to said chamber equalizes the forces on opposite sides of the valve element, and said aperture in the valve element permitting of the passage of steam pressure in the upper compartment into the lower compartment and the discharge thereof through said outlet passageway whereby the pressure above the valve element is reduced to permit of the opening thereof by the pressure within the inlet passage.

HERBERT JAMES CLEMENT WELLS.

References Cited in the file of this patent

UNITED STATES PATENTS

| Number | Name | Date |
|---|---|---|
| 1,150,503 | De Lancey | Aug. 17, 1915 |
| 1,631,876 | Macaulay | June 7, 1927 |
| 2,117,056 | Dunn | May 10, 1938 |
| 2,208,390 | Richter | July 16, 1940 |
| 2,370,296 | Ehretsman | Feb. 27, 1945 |